United States Patent
Kim et al.

(10) Patent No.: US 7,324,164 B2
(45) Date of Patent: Jan. 29, 2008

(54) DISPLAY APPARATUS AND CONTROL METHOD THEREOF

(75) Inventors: Dae-jung Kim, Seoul (KR); Sang-hak Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 11/020,045

(22) Filed: Dec. 23, 2004

(65) Prior Publication Data

US 2005/0140830 A1  Jun. 30, 2005

(30) Foreign Application Priority Data

Dec. 29, 2003  (KR) ............. 10-2003-0098651

(51) Int. Cl.
*H04N 9/69* (2006.01)

(52) U.S. Cl. .................................... 348/674

(58) Field of Classification Search ............ 348/674, 348/675, 254, 255, 189; 358/518, 519; 345/89, 102

See application file for complete search history.

(56) References Cited

U.S. PATENT DOCUMENTS

| | | | |
|---|---|---|---|
| 5,132,796 A * | 7/1992 | Topper et al. ............ | 348/674 |
| 5,329,211 A | 7/1994 | Sasaki et al. | |
| 5,483,259 A * | 1/1996 | Sachs ..................... | 345/600 |
| 5,574,664 A * | 11/1996 | Feasey .................... | 702/107 |
| 5,864,369 A * | 1/1999 | Swan ...................... | 348/448 |
| 5,864,370 A * | 1/1999 | Knox et al. .............. | 348/674 |
| 6,266,103 B1 * | 7/2001 | Barton et al. ............ | 348/675 |
| 6,404,422 B1 | 6/2002 | Choi | |
| 6,611,249 B1 * | 8/2003 | Evanicky et al. ......... | 345/102 |
| 6,795,091 B2 * | 9/2004 | Kim ....................... | 345/690 |

FOREIGN PATENT DOCUMENTS

JP  7-64522  3/1995

(Continued)

OTHER PUBLICATIONS

International Search Report (International Application No. PCT/KR2004/00178) filed on Jul. 12, 2004.

*Primary Examiner*—Paulos M. Natnael
(74) *Attorney, Agent, or Firm*—Stanzione & Kim, LLP (57) ABSTRACT

A display apparatus having a display to display a picture, including an input unit, a data operator, a storage unit to store data about a gamma curve to be applied corresponding to an average input brightness of an input video signal, an auto-adjuster to adjust a position and a definition of the picture being displayed on the display, a gamma adjuster to adjust an output brightness of the picture being displayed on the display, and a controller to control the data operator to calculate picture adjustment data about optimum position and optimum definition based on synchronous signals and the input video signal when the input unit generates an input signal, and controlling the data operator to calculate the average input brightness of the input video signal and the gamma adjuster to adjust the output brightness of the picture on the basis of the data about the gamma curve to be applied corresponding to the calculated average input brightness from the storage unit while controlling the auto-adjuster to adjust the picture with respect to the picture adjustment data. Thus, a display apparatus and a control method thereof are provided, in which a gamma adjustment is implemented while an auto-adjustment is implemented.

12 Claims, 8 Drawing Sheets

FOREIGN PATENT DOCUMENTS

| | | |
|---|---|---|
| JP | 7-143506 | 6/1995 |
| JP | 08194450 A | 7/1996 |
| JP | 08251515 A | 9/1996 |
| JP | 12020013 A | 1/2000 |
| JP | 2002-55666 | 2/2002 |
| KR | 199900025691 | 7/1999 |
| KR | 2000-0019087 A | 4/2000 |
| KR | 2002-0092075 | 12/2002 |
| KR | 2003-0026372 A | 4/2003 |

\* cited by examiner

(A) INHARMONIOUS FREQUENCY (B) HARMONIOUS FREQUENCY

FIG. 4

(A) INHARMONIOUS PHASE (B) HARMONIOUS PHASE

DISPLAY APPARATUS AND CONTROL METHOD THEREOF

CROSS-REFERENCE TO RELATED APPLICATIONS

This application claims the benefit of Korean Patent Application No. 2003-98651, filed Dec. 29, 2003, in the Korean Intellectual Property Office, the disclosure of which is incorporated herein by reference.

BACKGROUND OF THE INVENTION

1. Field of the Invention

The present invention relates to a display apparatus and a control method thereof, and more particularly, to a display apparatus and a control method thereof, in which a gamma adjustment is implemented while an auto-adjustment is implemented.

2. Description of the Related Art

In order to provide optimum picture quality, when a video signal is finally outputted, a display apparatus is adjusted variously according to a user's selections, for example, a gamma adjustment and an auto-adjustment are generally implemented.

The gamma adjustment adjusts brightness of the picture being displayed on a panel by compensating a color level difference between the video signal inputted to the display apparatus and the video signal outputted to the panel. Thus, the gamma adjustment is that a gamma curve showing the relation of the color levels between the input video signal and the output video signal is changed.

Here, the gamma curve is changed by changing a gain value and an offset value of each color level. However, a general user knows too little about the gain value and the offset value, so that the gamma adjustment is not well used even though the gamma adjustment is needed to display an optimum picture.

On the other hand, a user simply needs to press an auto-adjustment button in order to implement the auto-adjustment, thereby adjusting horizontal/vertical positions, a frequency and a focus of the video signal per frames, respectively. Occasionally, when the auto-adjustment button is pressed, the color level can be adjusted, but this is not enough. Thus, as compared with the gamma adjustment, the auto-adjustment is easily implemented by a user, and the results of the auto-adjustment are also easily understood by a user.

However, when a user implements the auto-adjustment, it is preferable that the gamma adjustment is implemented together with the auto-adjustment in order to get the optimum picture quality.

SUMMARY OF THE INVENTION

Accordingly, it is an aspect of the present general inventive concept to provide a display apparatus and a control method thereof, in which a gamma adjustment is implemented while an auto-adjustment is implemented.

Additional aspects and/or advantages of the general inventive concept will be set forth in part in the description which follows and, in part, will be obvious from the description, or may be learned by practice of the general inventive concept.

The foregoing and/or other aspects of the present general inventive concept are achieved by providing a display apparatus having a display to display a picture, the display apparatus including an input unit, a data operator, a storage unit to store data about a gamma curve to be applied corresponding to an average input brightness of an input video signal, an auto-adjuster to adjust a position and a definition of the picture being displayed on the display, a gamma adjuster to adjust an output brightness of the picture being displayed on the display, and a controller to control the data operator to calculate picture adjustment data about an optimum position and an optimum definition based on synchronous signals and the input video signal when the input unit generates an input signal, and to control the data operator to calculate the average input brightness of the input video signal, and to control the gamma adjuster to adjust the output brightness of the picture on the basis of the data about the gamma curve to be applied corresponding to the calculated average input brightness from the storage unit while controlling the auto-adjuster to adjust the picture with respect to the picture adjustment data.

According to another aspect of the present general inventive concept, the above and/or other aspects may also be achieved by providing a method of controlling a display apparatus having a display to display a picture, the method including storing data about a gamma curve to be applied corresponding to an average input brightness of an input video signal, generating an input video signal, calculating picture adjustment data about an optimum position and an optimum definition of the picture based on synchronous signals and the input video signal, adjusting the picture with respect to the picture adjustment data, calculating an average input brightness of the input video signal, and adjusting an output brightness of the picture on the basis of the stored data about the gamma curve to be applied corresponding to the calculated average input brightness of the input video signal.

BRIEF DESCRIPTION OF THE DRAWINGS

These and other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
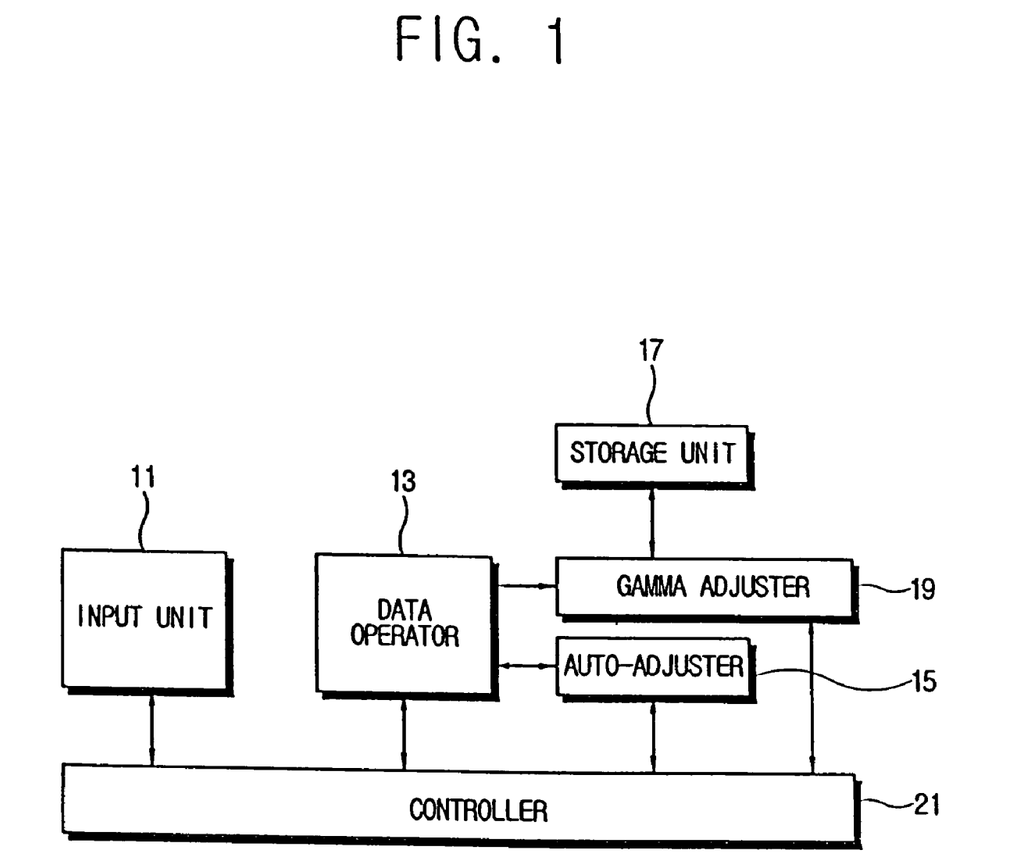
FIG. 1 is a block diagram of a display apparatus according to an embodiment of the present general inventive concept.

As shown in FIG. 1, a display apparatus according to an embodiment of the present general inventive concept includes a display to display a picture thereon, an input unit 11, a data operator 13, a storage unit 17, a gamma adjuster 19, an auto-adjuster 15, and a controller 21.

The auto-adjuster 15 can adjust position and a definition of a picture being displayed on the display. Here, the position refers to horizontal and vertical positions of the picture. Further, the definition refers to a frequency and a focus of the picture, and occasionally refers to a color level of the picture.

The gamma adjuster 19 can adjust an output brightness of the picture being displayed on the display. Further, the storage unit 17 stores data about a gamma curve to be applied corresponding to an average input brightness of an input video signal.

The controller 21 can include a microcomputer. When the input unit 11 (e.g., a function key provided on the display apparatus) generates an input signal by a user, the controller 21 can control the data operator 13 to calculate picture adjustment data about an optimum position and an optimum definition of the picture based on horizontal/vertical synchronous signals and the input video signal. Further, the controller 21 can control the auto-adjuster 15 to adjust the picture on the basis of the calculated picture adjustment data.

Also, the controller 21 can control the data operator 13 to calculate the average input brightness of the input video signal. Further, the controller 21 can control the gamma adjuster 19 to adjust the output output brightness of the picture on the basis of the data about the gamma curve corresponding to the calculated average input brightness, wherein the data about the gamma curve is being stored in the storage unit 17.

Figure 2:
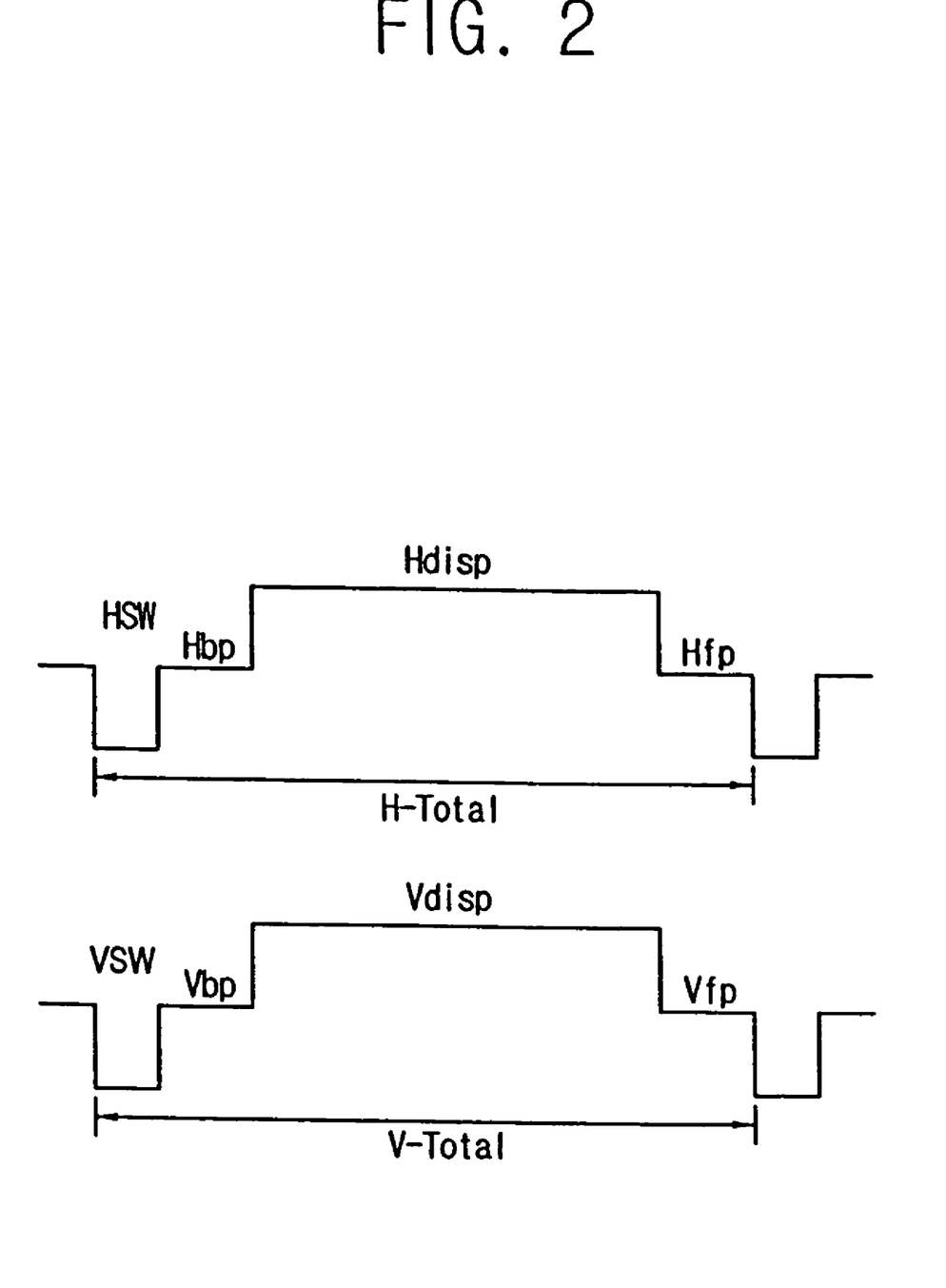
FIG. 2 illustrates a waveform of a video signal being inputted to the display apparatus of FIG. 1.

As shown in FIG. 2, a horizontal component of the input video signal may include an H-start width (HSW), an H-back porch (Hbp), an H-front porch (Hfp), and an H-display (Hdisp). Further, a vertical component of the input video signal may include a V-start width (VSW), a V-back porch (Vbp), a V-front porch (Vfp), and a V-display (Vdisp).

The HSW and the VSW indicate starts of the horizontal and vertical components of the video signal per frame, respectively. The Hdisp and the Vdisp indicate the horizontal and vertical components of a picture per each frame, respectively. The Hbp and the Hfp are respectively placed in back and front of the Hdisp, and the Vbp and the Vfp are respectively placed in back and front of the Vdisp, wherein the Hbp, Hfp, Vbp and Vfp are not displayed as a picture.

The data operator 13 can check where the Hbp and Hfp of each horizontal component of the input video signal are placed and where the Vbp and Vfp of each vertical component of the input video signal are placed. Further, the data operator 13 can check where the horizontal and vertical components of a picture per each frame are respectively started and ended, and can transmit data about the start and the end of the horizontal and vertical components to the auto-adjuster 15.

The auto-adjuster 15 can adjust the horizontal and vertical positions of a picture on the basis of the data about the starts and the ends of the respective horizontal and vertical components of the picture per each frame.

Figure 3:
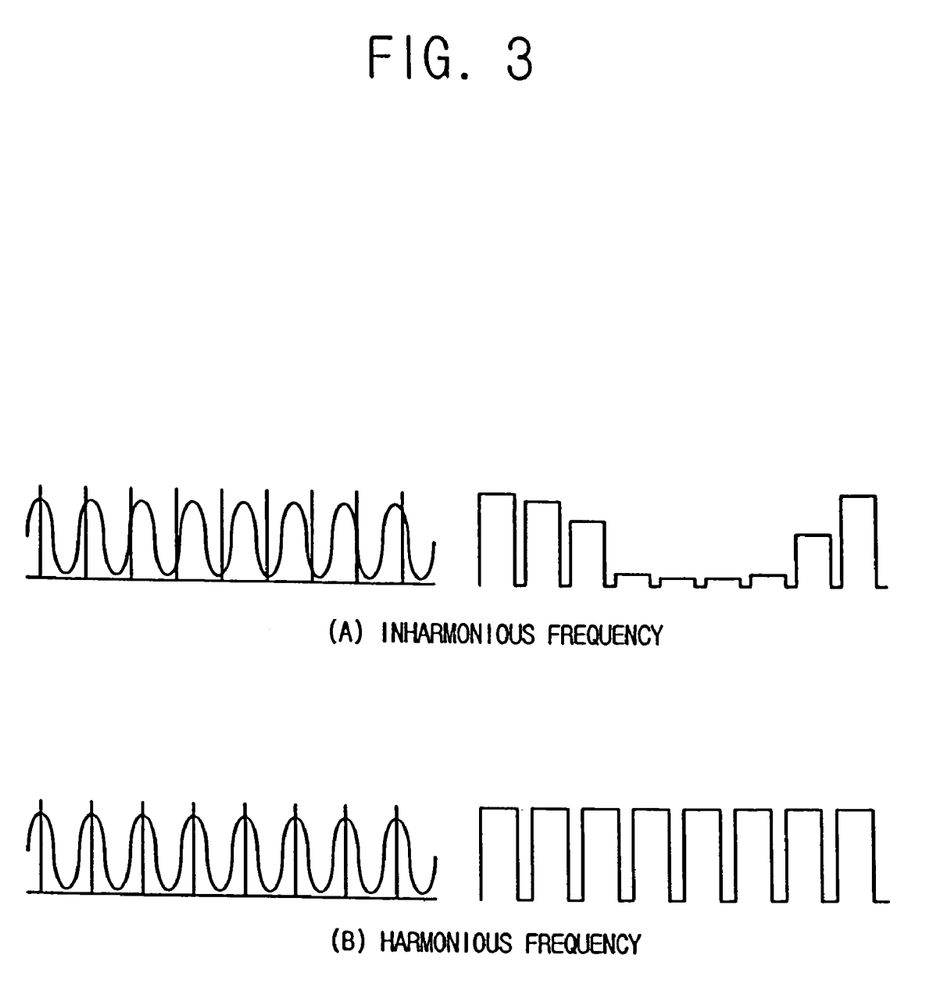
FIG. 3 illustrates a waveform for a coarse adjustment in the display apparatus of FIG. 1.

Further, the input video signal can be sampled to have a regular frequency before being converted from an analog signal to a digital signal. As shown in (A) of FIG. 3, in a case where the input video signal has irregular voltage fluctuations, the analog input video signal needs to be adjusted by a coarse adjustment.

The data operator 13 can apply various sampling frequencies to the analog input video signal, and can detect the sampling frequency at which the analog input video signal has a regular voltage pattern. Further, the auto-adjuster 15 can sample the analog input video signal with respect to the sampling frequency detected by the data operator 13. Thus, the analog input video signal can be sampled to have the regular frequency as shown in (B) of FIG. 3.

Figure 4:
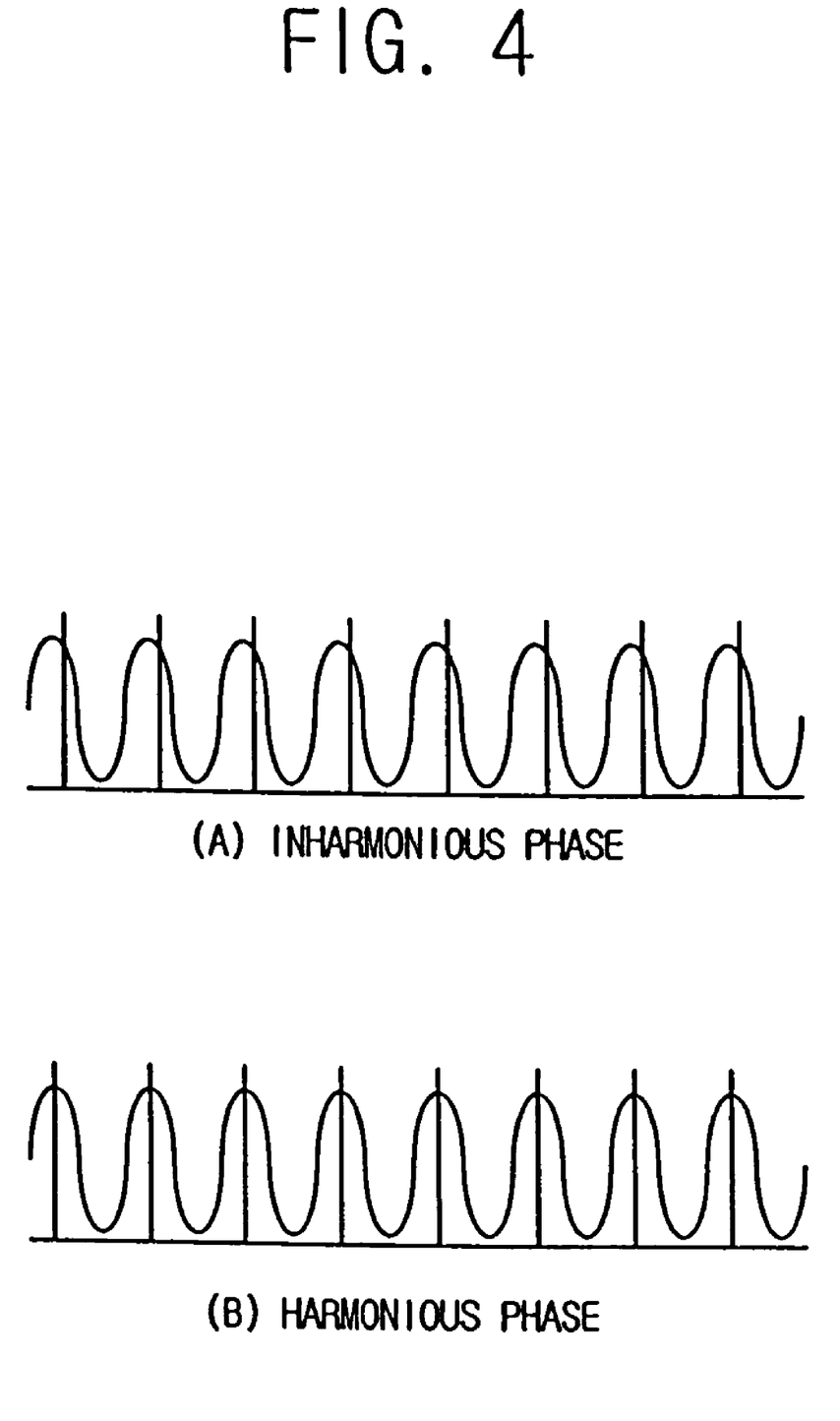
FIG. 4 illustrates a waveform for a fine adjustment in the display apparatus of FIG. 1.

Further, as shown in (A) of FIG. 4, in the case where the analog video input signal has the regular voltage pattern but has an inharmonious phase, and therefore a picture is dimly displayed, the analog input video signal needs to be adjusted by a fine adjustment.

The data operator 13 can apply various sampling timings to the analog input video signal, and can detect the sampling timing at which the analog input video signal has a highest voltage. Further, the auto-adjuster 15 can sample the analog input video signal with respect to the sampling timing detected by the data operator 13. Thus, the analog input video signal can be sampled to have a harmonious phase as shown in (B) of FIG. 4, thereby allowing a picture to have sharpness in focus.

Figure 5:
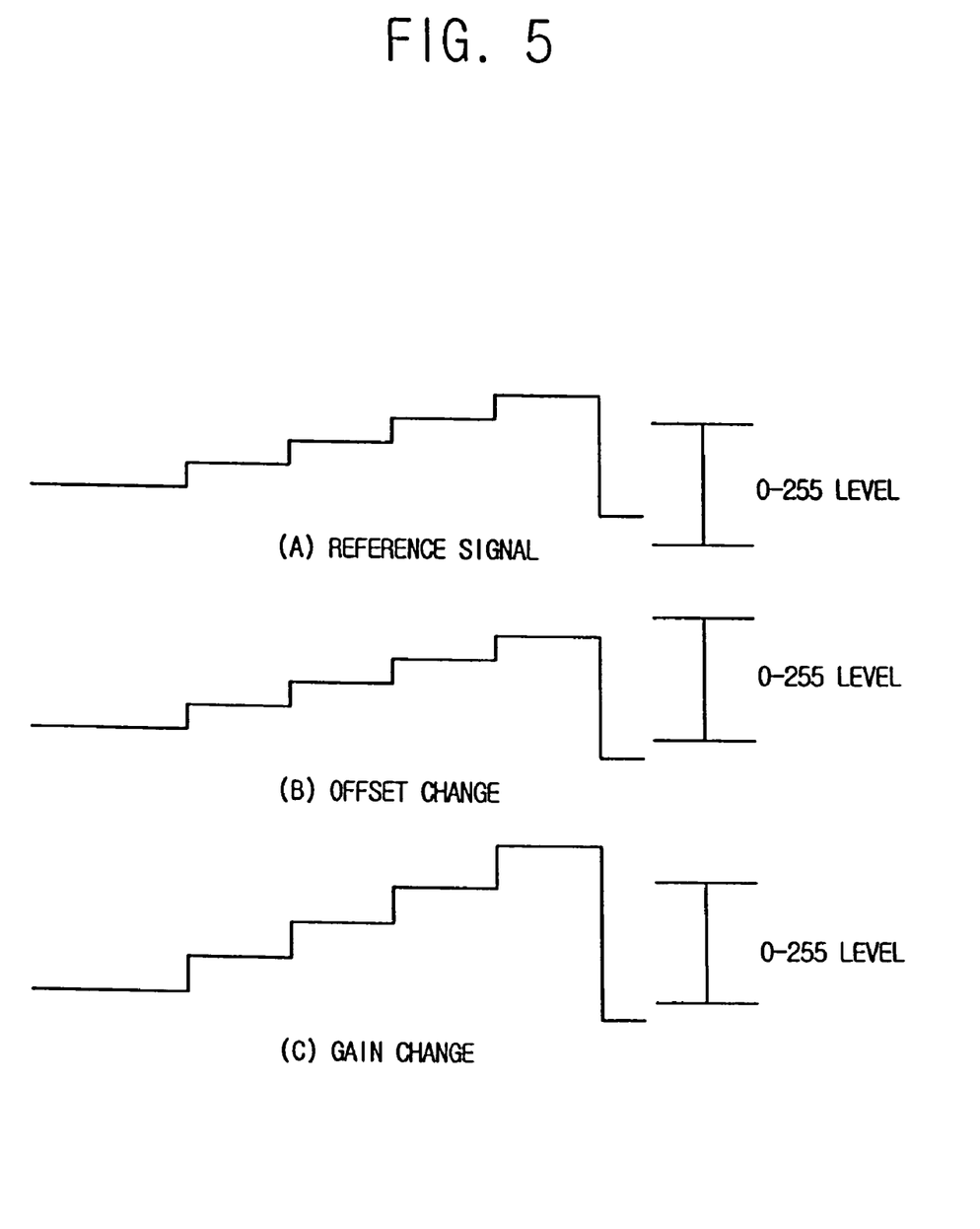
FIG. 5 illustrates a waveform for a color level adjustment in the display apparatus of FIG. 1.

Further, the auto-adjustment can occasionally include a color level adjustment. At this time, the data operator 13 can check highest and lowest color levels of red (R), green (G) and blue (B) components of the analog input video signal, and regards 0V of the color levels of the respective RGB components of the analog input video signal as a digital value of 0 and the highest color level, e.g., 0.7V ~1.0V as a digital value of 255, or a reference value.

At full color saturation, the highest color level always has the digital value of 255, so that the data operator 13 can lower a gain value and gradually increase the lowered gain value, thereby detecting the gain value of when the highest color level has the digital value of 255 or the reference value. Similarly, at the full color saturation, the lowest color level always has the digital value of 0, so that the data operator 13 can raise an offset value and gradually decrease the raised offset value, thereby detecting the offset value of when the lowest color level has the digital value of 0.

Thus, as shown in FIG. 5, the auto-adjuster 15 can adjust the color level by changing a reference signal on the basis of the gain value and the offset value which are detected by the data operator 13.

Further, the data operator 13 can calculate the average input brightness of the input video signal.

The storage unit 17 can store the data about the gamma curve to be applied corresponding to the average input brightness of the input video signal in a tabular form. Further, the data about the gamma curve can be stored as the offset value and the gain value corresponding to each color level.

The gamma adjuster 19 can read the data about the gamma curve corresponding to the calculated average input brightness from the storage unit 17, and can adjust the output brightness of the picture on the basis of the offset value and the gain value corresponding to each color level.

Figure 6:
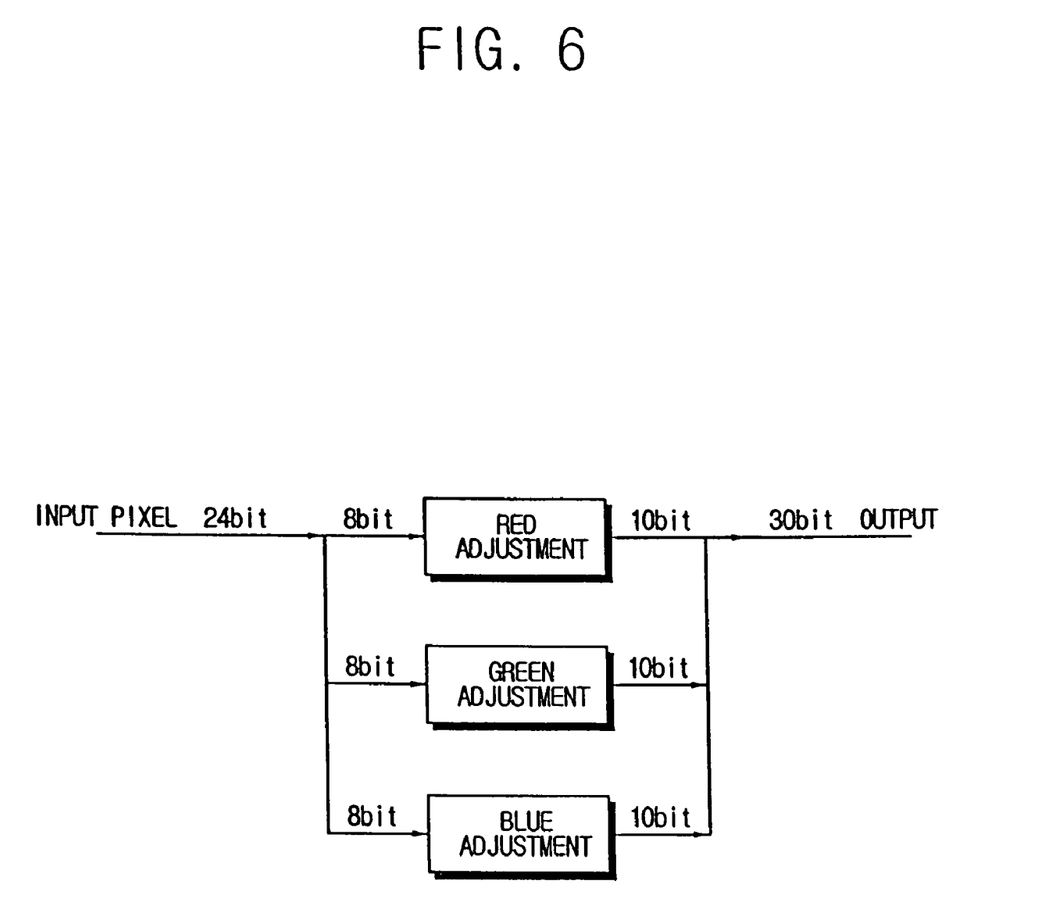
FIG. 6 illustrates a waveform for a gamma adjustment in the display apparatus of FIG. 1.

As shown in FIG. 6, the gamma adjuster 19 can adjust the output brightness by changing the offset values and the gain values corresponding to the respective color levels of RGB components. For example, each of the RGB components having the color levels of 8 bit or 256 varieties of the color levels can be adjusted. Each of the RGB components having the color levels of 10 bit or 1024 varieties of the color levels can be adjusted by the gamma adjuster 19.

Figure 7:
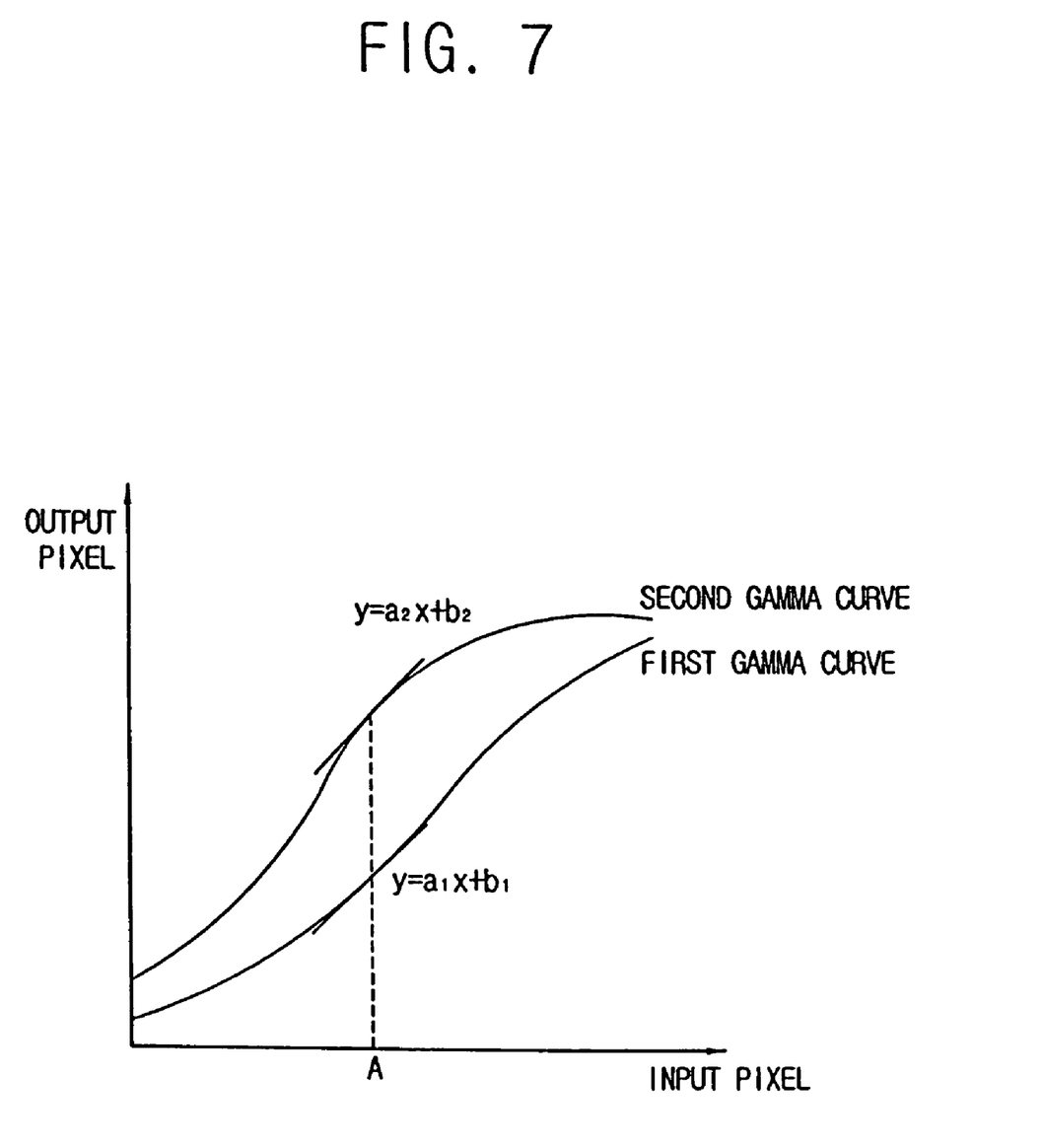
FIG. 7 is a graph of gamma curves according to the gamma adjustment of FIG. 6.

Thus, as shown in FIG. 7, if a first gamma curve indicates the current gamma curve being applied and a second gamma curve indicates the stored gamma curve to be applied corresponding to the average input brightness of the input video signal, the gamma adjuster 19 can adjust the output brightness on the basis of the data about the second gamma curve stored in the storage unit 17. That is, the gamma adjuster 19 can adjust the output brightness on the basis of the offset value and the gain value corresponding to each color level from the second gamma curve.

For example, in the case of an "A" color level, the gain value and the offset value are changed into "$a_2$" and "$b_2$", respectively. Then, the gamma adjuster 19 can adjust the output brightness on the basis of "$a_2$" and "$b_2$" corresponding to the "A" color level.

Figure 8:
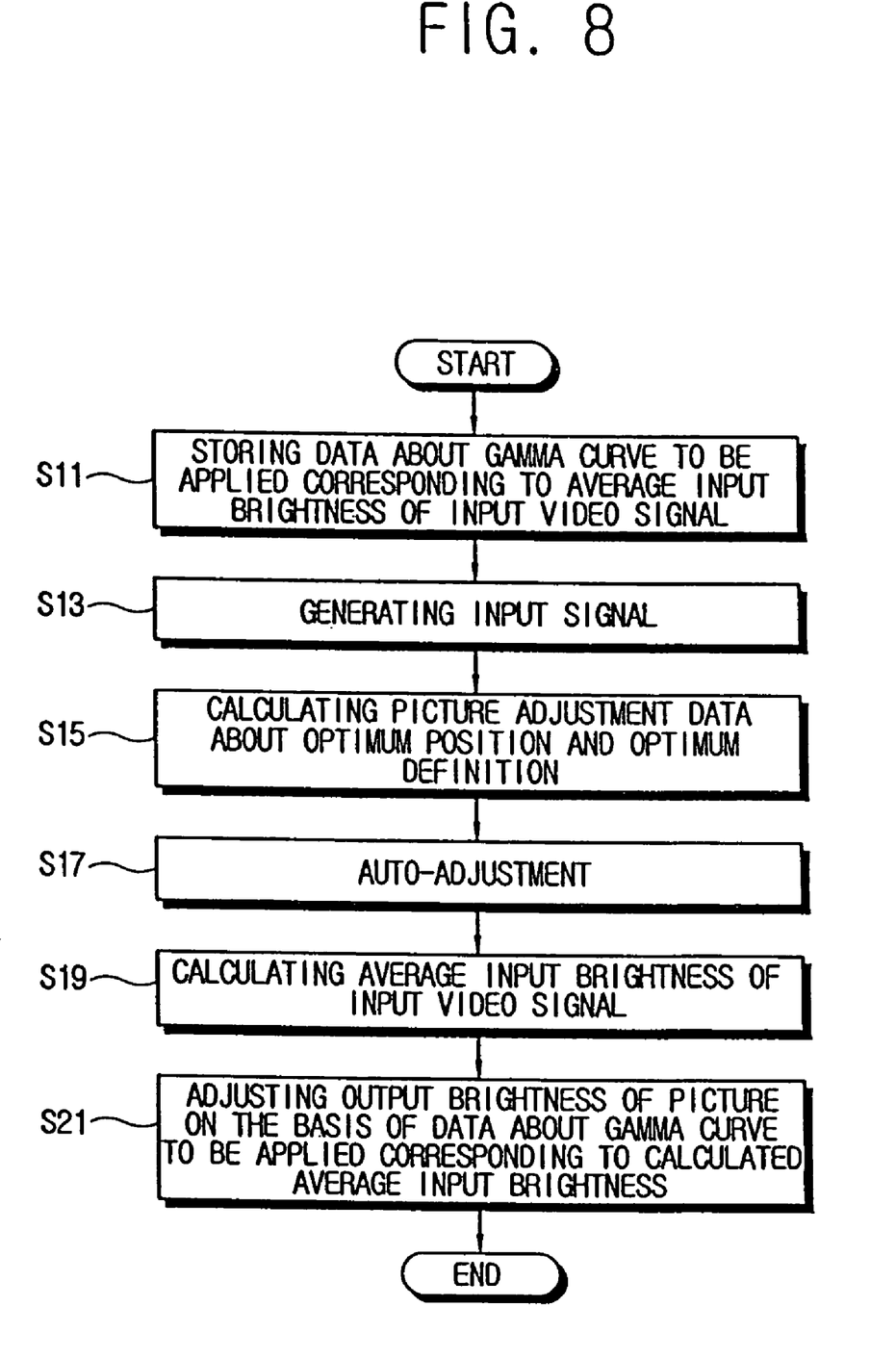
FIG. 8 is a control flowchart of the display apparatus of FIG. 1.

Hereinbelow, operations of the display apparatus according to FIG. 1 will be described with reference to FIGS. 1 and 8.

At operation S11, the storage unit 17 stores the data about the gamma curve to be applied corresponding to the average input brightness of the input video signal in a tabular form.

When, at operation S13, the input unit 11 (e.g., a function key provided on the display apparatus) generates an input signal by a user, at operation S15, the controller 21 controls the data operator 13 to calculate picture adjustment data about the optimum position and the optimum definition based on the synchronous signals and the input video signal.

At this time, the data operator 13 checks where the horizontal and vertical components of a picture per each frame are respectively started and ended, and detects the sampling frequency at which the analog input video signal has a regular voltage. Further, the data operator 13 applies various sampling timings to the analog input video signal, and detects the sampling timing at which the analog input video signal has the highest voltage. Further, the data operator 13 checks highest and lowest color levels of the RGB components of the analog input video signal, and regards 0V of the color levels of the respective RGB components of the analog input video signal as a digital value of 0 and the highest color level, e.g., 0.7V ~1.0V as a digital value of 255 or a reference value.

At operation S17, the controller 21 controls the auto-adjuster 15 to adjust a picture on the basis of the picture adjustment data.

Therefore, the auto-adjuster 15 adjusts the horizontal/vertical positions, the frequency, the focus and the color level of a picture per each frame with respect to the picture adjustment data.

At operation S19, the controller 21 controls the data operator 13 to calculate the average input brightness of the input video signal. Then, at operation S21, the controller 21 controls the gamma adjuster 19 to adjust the output brightness of a picture on the basis of the data about the gamma curve corresponding to the calculated average input brightness.

Thus, the gamma adjuster 19 adjusts the output brightness of a picture on the basis of the offset value and the gain value corresponding to each color level from the second gamma curve corresponding to the calculated average input brightness.

As described above, the present general inventive concept provides a display apparatus and a control method thereof, in which a gamma adjustment is implemented while an auto-adjustment is implemented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus having a display to display a picture, comprising:
    an input unit;
    a data operator;
    a storage unit to store data about a gamma curve to be applied corresponding to an average input brightness of an input video signal;
    an auto-adjuster to adjust a position and a definition of the picture being displayed on the display;
    a gamma adjuster to adjust an output brightness of the picture being displayed on the display; and
    a controller to control the data operator to calculate picture adjustment data about an optimum position and an optimum definition of the picture based on synchronous signals and the input video signal when the input unit generates an input signal, and to control the data operator to calculate the average input brightness of the input video signal and to control the gamma adjuster to adjust the output brightness of the picture on the basis of the data about the gamma curve to be applied corresponding to the calculated average input brightness from the storage unit while controlling the auto-adjuster to adjust the picture with respect to the picture adjustment data.

2. The display apparatus according to claim 1, wherein the synchronous signals include horizontal and vertical synchronous signals.

3. The display apparatus according to claim 1, wherein a horizontal component of the input video signal comprises an H-start width (HSW), an H-back porch (Hbp), an H-front porch (Hfp), and an H-display (Hdisp), and a vertical component of the input video signal comprises a V-start width (VSW), a V-back porch (Vbp), a V-front porch (Vfp), and a V-display (Vdisp).

4. The display apparatus according to claim 3, wherein the data operator 13 checks where the Hbp and Hfp of each horizontal component of the input video signal are placed and where the Vbp and Vfp of each vertical component of the input video signal are placed, checks where the horizontal and vertical components of the picture per each frame are respectively started and ended, and transmits data about the start and the end of the horizontal and vertical components to the auto-adjuster.

5. The display apparatus according to claim 3, wherein the auto-adjuster adjusts the horizontal and vertical positions of the picture on the basis of the data about the starts and the ends of the respective horizontal and vertical components of the picture per each frame.

6. The display apparatus according to claim 1, wherein the input video signal is sampled to have a regular frequency before being converted from an analog signal to a digital signal.

7. The display apparatus according to claim 1, wherein when the analog input video signal has irregular voltage fluctuations, the data operator applies various sampling frequencies to the analog input video signal to detect the sampling frequency at which the analog input video signal has a regular voltage, and the auto-adjuster samples the analog input video signal with respect to the sampling frequency detected by the data operator.

8. The display apparatus according to claim 1, wherein when the input video signal comprises an analog input video signal having an inharmonious phase, the data operator applies various sampling timings to the analog input video signal and detects the sampling timing at which the analog input video signal has a highest voltage, and the auto-adjuster samples the analog input video signal with respect to the sampling timing detected by the data operator.

9. The display apparatus according to claim 1, wherein when the auto-adjustment includes a color level adjustment, and at full color saturation, the data operator lowers a gain value and gradually increases the lowered gain value to detect the gain value of when the highest color level has the digital value of 255, and the data operator raises an offset value and gradually decreases the raised offset value to detect the offset value of when the lowest color level has the digital value of 0.

10. The display apparatus according to claim 9, wherein the auto-adjuster adjusts a color level of the input video signal by changing a reference signal on the basis of the gain value and the offset value which are detected by the data operator.

11. A display apparatus having a display to display a picture, the display apparatus comprising:
  an input unit to generate an input signal by a user;
  a data operator to calculate picture adjustment data about an optimum position and an optimum definition of the picture based on horizontal and vertical synchronous signals and an input video signal, and to calculate an average input brightness of the input video signal;
  an auto-adjuster to adjust a position and a definition of a picture being displayed on the display and to adjust an output brightness of the picture being displayed on the display;
  a gamma adjuster to adjust an output brightness of the picture being displayed on the display;
  a storage unit to store data about a gamma curve to be applied corresponding to the average input brightness of the input video signal; and
  a controller to control the data operator to calculate the average input brightness of the input video signal, the gamma adjuster to adjust the output brightness of the picture on the basis of the data about the gamma curve to be applied corresponding to the calculated average input brightness from the storage unit, and the auto-adjuster to adjust the picture with respect to the picture adjustment data, simultaneously.

12. A method of controlling a display apparatus having a display to display a picture, the method comprising:
  storing data about a gamma curve to be applied corresponding to an average input brightness of an input video signal;
  generating the input video signal;
  calculating picture adjustment data about an optimum position and an optimum definition of the picture based on synchronous signals and the input video signal;
  adjusting the picture with respect to the picture adjustment data;
  calculating the average input brightness of the input video signal; and
  adjusting an output brightness of the picture on the basis of the stored data about the gamma curve to be applied corresponding to the calculated average input brightness of the input video signal.

* * * * *